United States Patent
Santos et al.

(10) Patent No.: US 9,172,582 B2
(45) Date of Patent: Oct. 27, 2015

(54) CELLULAR NETWORK CALL MANAGEMENT

(71) Applicant: VODAFONE GROUP PLC, Newbury, Berkshire (GB)

(72) Inventors: Juan Miguel Santos, Madrid (ES); Rogelio Martinez, Madrid (ES); Fernando Laloma, Madrid (ES)

(73) Assignee: VODAFONE GROUP PLC, Newbury, Berkshire (GB)

( * ) Notice: Subject to any disclaimer, the term of this patent is extended or adjusted under 35 U.S.C. 154(b) by 124 days.

(21) Appl. No.: 13/728,795

(22) Filed: Dec. 27, 2012

(65) Prior Publication Data

US 2013/0208658 A1  Aug. 15, 2013

(30) Foreign Application Priority Data

Dec. 28, 2011 (GB) .................................. 1122387.2

(51) Int. Cl.
| | |
|---|---|
| H04W 4/00 | (2009.01) |
| H04L 29/06 | (2006.01) |
| H04W 76/02 | (2009.01) |
| H04M 7/12 | (2006.01) |

(52) U.S. Cl.
CPC .... *H04L 29/06326* (2013.01); *H04L 29/06027* (2013.01); *H04L 65/1069* (2013.01); *H04M 7/123* (2013.01); *H04W 76/02* (2013.01); *H04L 65/1016* (2013.01); *H04M 7/12* (2013.01)

(58) Field of Classification Search
USPC ................. 370/328–331, 352–357, 395–401; 455/433–435, 444–517; 709/224–231
See application file for complete search history.

(56) References Cited

U.S. PATENT DOCUMENTS

| | | | | |
|---|---|---|---|---|
| 8,306,531 | B2 * | 11/2012 | Zhu et al. .................... | 455/435.1 |
| 8,503,391 | B2 * | 8/2013 | Mahdi ........................... | 370/331 |
| 8,711,846 | B2 * | 4/2014 | Mahdi et al. .................. | 370/354 |
| 8,811,288 | B2 * | 8/2014 | Lindholm et al. ............ | 370/328 |
| 2006/0218291 | A1 * | 9/2006 | Zhu et al. ...................... | 709/229 |
| 2006/0268904 | A1 * | 11/2006 | Bae et al. ....................... | 370/401 |
| 2007/0274301 | A1 * | 11/2007 | Mutikainen ................... | 370/357 |
| 2008/0254816 | A1 * | 10/2008 | Sun et al. ...................... | 455/466 |
| 2009/0097421 | A1 | 4/2009 | Zhu | |
| 2010/0215018 | A1 * | 8/2010 | Ejzak ............................ | 370/331 |
| 2011/0116473 | A1 * | 5/2011 | Shaheen et al. ............... | 370/331 |

OTHER PUBLICATIONS

EPO Search report P101124-EP-EPA, Application No. EP 12275220.7-1854 dated Mar. 25, 2013.

(Continued)

*Primary Examiner* — Man Phan
(74) *Attorney, Agent, or Firm* — Workman Nydegger (57) ABSTRACT

Management of a call between a calling party that is a mobile terminal in a first cellular network and a called party that is a mobile terminal in a second cellular network is provided by: receiving at an Application Server, AS, of the first cellular network a request to establish a call with the called party from the calling party, the called party being identified in the indication by a circuit-switched identifier; identifying a registration for the called party in the first cellular network using the circuit-switched identifier for the called party, the registration providing a packet-switched identifier for the called party; and setting up a call between the calling party and the called party of the first cellular network by initiating a packet-switched connection from the AS in the first cellular network to the called party in the second cellular network using the packet-switched identifier for the called party.

22 Claims, 5 Drawing Sheets

(56) References Cited

OTHER PUBLICATIONS

ZTE Corporation: "A solution to anchor a CS origination call to IMS domain", 3GPP Draft; S2-051954 Static Anchor Solution, 3rd Generation Partnership Project (3GPP), Mobile Competence Centre ; 650, Route Des Lucioles ; F-06921 Sophia-Antipolis Cedex ; France, vol. SA WG2, No. Sophia; Aug. 27, 2005, XP050253418, [retrieved on Aug. 27, 2005].

Zhongwen Zhu Ed—Shuo-Jen Hsu et al: "An IMS Based Interworking Solution for Multimedia Service in a Converged Network", Multimedia and Ubiquitous Engineering, 2008. MUE 2008. International Conference on, IEEE, Piscataway, NJ, USA, Apr. 24, 2008, pp. 19-24, XP031263650, ISBN: 978-0-7695-3134-2.

Siemens AG: "Mobile Terminated Call between IMS and CS", 3GPP Draft; S2-001456, 3rd Generation Partnership Project (3GPP), Mobile Competence Centre; 650, Route Des Lucioles; F-06921 Sophia-Antipolis Cedex; France, No. Bristol, UK; Sep. 11, 2000, XP050344979.

\* cited by examiner

CELLULAR NETWORK CALL MANAGEMENT

CROSS REFERENCE TO RELATED APPLICATIONS

This application claims priority to United Kingdom Application Number 1122387.2, filed on Dec. 28, 2011, the entirety of which is incorporated herein by reference.

FIELD OF THE INVENTION

The invention relates to a method and system for establishing telephone calls (voice or data), especially within cellular networks and particularly international calls. In particular, the invention relates to the use of conventional IP call connection procedures to connect a first mobile terminal in a first cellular network to another party which may be a second mobile terminal in a second cellular network, the second cellular network being distinct from the first.

BACKGROUND TO THE INVENTION

Cellular (e.g. GSM or UMTS (3G)) architectures include a core network (CN) and a radio access network (RAN). Mobile terminals, once authenticated to a given network, place calls by first reserving a suitable channel on the RAN and then requesting connection to other terminals giving a called number (MSISDN) to identify the called party. The CN looks up at least one database to locate the called party terminal and to allow a call to be terminated at that called party terminal. Where the called party terminal belongs to a second network (different from the given network with which the calling party terminal is authenticated), this requires the establishment of a radio access channel from a mobile terminal to the core network of a first cellular network; the establishment of a link between the first network and a second cellular network; and the establishment of a further radio access channel to a second mobile terminal via the second cellular network.

The Internet protocol multimedia subsystem (IMS) is a set of core network servers logically sited behind the gateway GPRS support node (GGSN) in the packet switched domain of a cellular telecommunications network. The servers process signalling between terminals. The aim of IMS is to allow users such as mobile telephone network service providers to provide services to their subscribers as efficiently and effectively as possible and independently of the manner by which its network is accessed. The IMS architecture is intended to support, for example, the following communication types: voice, video, instant messaging, "presence" (a user's availability for contact), location based services, e-mail and web. Further communication types are likely to be added in the future.

3GPP has chosen session initiation protocol (SIP) for managing these sessions. The SIP protocol is a session-based protocol designed to establish IP-based communication sessions between two or more terminals. SIP is used as a means of signalling, end-to-end, the initiation, modification and termination of packet switched sessions. Once a SIP session has been established, communication between the terminals can be carried out using a variety of different protocols (for example, those designed for streaming audio and video). These protocols are defined in SIP session initiation messages.

With IMS, users are no longer restricted to a separate voice call or data session. Sessions can be established between terminals that allow a variety of communication types to be used and media to be exchanged. The sessions are dynamic in nature in that they can be adapted to meet the needs of the end users. For example, two such users might start a session with an exchange of instant messages and then decide that they wish to change to a voice call, possibly with video. This is all possible within the IMS framework. If a user wishes to send a file to another user and the users already have a session established between each other (for example, a voice session), the session can be re-defined to allow a data file exchange to take place. This session redefinition is transparent to the end user.

International calls made in conventional fixed line (e.g. PSTN) or cellular (e.g. GSM or UMTS (3G)) telecommunications architectures are readily identifiable as such to a calling party (originator) because making such a call requires the use of an international dialing code. In addition, network service providers are conventionally allocated dialing codes, which codes each network service provider has been allocated being publicly available. Accordingly, it has been possible for a calling party to determine that a conventional call will be an "international" call before making the call.

The SIP protocol identifies a terminal by an address of the form "user@domain". If a user (the calling party) wishes to establish a session, which may be for any supported communication type, with another user (the called party), signalling will initially be directed to the called party using an address of this form. Such an address provides no indication of the geographical location of the called party. Even if, for example, the domain includes an identifier of a country, such as the domain ".co.uk", such a domain can be the address of a terminal neither located in that country nor registered with a network service provider of that country. As a result, the calling party, using SIP, does not know in advance of initiating a session whether the called party's terminal is registered in the same country as the calling party's terminal, or in another country. The charge payable by the calling party to the network service provider with which the calling party is registered for the session is typically dependent upon the country in which the called party's terminal is registered. An international call conventionally attracts a higher charge rate.

Furthermore each party that wishes to access the additional services offered by the IMS needs to subscribe to the required services.

Clearly, the calling party may wish to know the applicable charge rate to confirm that charges payable to the network service provider will not exceed what should be expected.

One disadvantage of conventional international call connection is the requirement for the reservation of a significant amount of network resource in both originating and terminating networks—the call establishment signalling inevitably requires HLR resource as well as MSC/VLR resource—as well as the provision of a suitable international carrier interface between the two networks. In turn, the use of additional resource is reflected in the cost of the service provided to customers.

IP call connection reduces the signalling overhead but imposes other constraints—notably the need for IP multimedia Subsystem (IMS) subscriptions for both originator and terminating party.

SUMMARY OF THE INVENTION

Against this background, the present invention provides a method of managing a call between a calling party that is a mobile terminal in a first cellular network and a called party in a second telephony network, the method comprising: receiving at an Application Server (AS) of the first cellular network an request to establish a call with the called party from the calling party, the called party being identified in the indication by a circuit-switched identifier; identifying a registration for the called party in the first cellular network using the circuit-switched identifier for the called party, the registration providing a packet-switched identifier for the called party; and setting up a call between the calling party and the called party by initiating a packet-switched connection from the AS in the first cellular network to the called party in the second telephony network using the packet-switched identifier for the called party. Preferably, the registration is in the Session Border Controller (SBC) of first cellular network, although it could be in the AS, another part of the IP Multimedia System (IMS) of the first cellular network, a part of the Core Network (CN) of the first cellular network or a part of the Radio Access Network (RAN) of the first cellular network. In the preferred embodiment, the registration is a temporary registration.

Advantageously, the packet-switched connection is made from the AS in the first cellular network directly to the called party in the second network. Preferably, the called party is a mobile terminal and the second telephony network is a second cellular network. In the preferred embodiment, the call uses an Internet Protocol (IP) based connection between the AS in the first cellular network and the called party. The second network is advantageously distinct from the first network.

Thus, the AS manages the call directly with not only the calling party but also the called party. This avoids the need for the core network, IMS components or both of the first cellular network to exchange any information with the second network. The called party may communicate directly with the AS in the first cellular network through an Internet connection or some other link that does not use the backhaul infrastructure of the second (cellular) network that is designed for communication with the first cellular network. Moreover, the AS only needs to store a circuit-switched identifier and a linked packet-switched identifier for the called party, without detailed other information. No charging information for the called party needs to be stored or passed to the second network, especially when this is a cellular network. This also avoids incurring licence costs on the IMS network of the first cellular network for called parties that are not subscribers to that network. In addition, the calling party does not require any login using a password to make an IP-based call, since the existing cellular network signalling is used, making it easier and more secure for the calling party.

Advantageously, the circuit-switched identifier is a Mobile Subscriber ISDN (MSISDN) Number. Preferably, the packet-switched identifier is or is based on an IP address.

Either or both of the calling party and called party beneficially uses an application in order to control and implement the IP-based call. The IP-based call may use voice, video or a combination. Other data-based services may additionally or alternatively be provided.

Beneficially, the method further comprises identifying, at the first cellular network, a circuit-switched request from the calling party to establish a call with the called party. This may be a conventional request to establish a circuit switched call using signalling specific to the first cellular network or more particularly to the radio access network, core network or both of the first cellular network. Then, the method may further comprise routing the request to the AS in the first cellular network. This routing is preferably carried out using a Media Gateway (MGW). In the preferred embodiment, the method further comprises determining, at the first cellular network, that the circuit-switched request to establish a call is intended for the AS based on information in the request. Then, the step of routing the request to the AS may be in response to the determination. For example, a specific prefix may be added to the circuit switched identifier (such as MSISDN) in the call establishment request that identifies to the first cellular network that the request should be routed to the MGW. The MGW may then route the request to the AS. Alternatively, the request may be routed directly to the AS or made using packet-switched signalling.

Advantageously, the step of setting up the call between the calling party and the called party comprises setting up a circuit-switched connection between the calling party and the first cellular network (for instance, between the called party and the MGW or the AS) and a packet-switched connection between the AS in the first cellular network and the called party in the second cellular network. Thus, the calling party may use the circuit-switched part of the first cellular network. However, the called party uses a packet-switched connection to the AS in the first cellular network. This means that the called party can use a radio access network (such as GSM, UMTS, LTE, WiMax, etc) to provide packet-switched data service via the Internet to the AS, but it can alternatively use WiFi or a fixed (that is, non-wireless) Internet connection. The call is beneficially converted by the first cellular network to a packet-switched IP-based call to send it through Internet, using the AS as part of the IMS network in the first cellular network.

Preferably, the method further comprises sending a circuit-switched message from the first cellular network to the called party in the second cellular network using the circuit-switched identifier for the called party, in response to the received request to establish a call. Typically, the circuit-switched message is sent from the AS. Beneficially, the circuit-switched message uses the Short Messaging Service (SMS). A hidden SMS is advantageously used for this purpose. This message may form part of the call set up process in order to initialise the call.

In some embodiments, the method further comprises activating an application on the called party (mobile) terminal for receiving IP-based calls from the AS in the first network in response to the received circuit-switched message, such as a hidden SMS. In such embodiments, the method may further comprise determining that the called party is not able to receive an IP-based call from the AS. Then, the step of sending the circuit-switched message is optionally carried out in response to the step of determining. For example, the step of determining may establish that the application for receiving IP-based calls from the AS in the first network is not currently operative on the called party mobile terminal. This determination may be made in a number of ways.

In the preferred embodiments, the method further comprises receiving packet-switched data from the called party at the AS in the first cellular network, the packet-switched data identifying an activity status for the called party. This information may be used for the determining step. The method may further comprise storing the received activity status at the AS in the first cellular network. Optionally, the method further comprises communicating an indication of the activity status for the called party to the calling party based on the activity status stored by the AS for the called party. This may be used by the calling party to identify the called party and determine when to make a call to the called party. In embodiments in which the step of sending the circuit-switched message is carried out in response to the step of determining, the step of determining that the called party is not able to receive an IP-based call from the AS may be based on the activity status stored by the AS for the called party. This is in accordance with the explanation provided above.

The step of identifying a registration for the called party may be preceded by a registration process, which is typically a process of temporary registration. Preferably, the method further comprises receiving a registration request from the called party in the second cellular network at the AS in the first cellular network. Optionally, the step of receiving a registration request may be preceded by a step of sending a circuit-switched message from the first cellular network to the called party in the second network using the circuit-switched identifier for the called party, in response to the received request to establish a call. The registration may identify the circuit-switched identifier for the called party and the packet-switched identifier for the called party. Then, the method may further comprise adding a registration for the called party at the AS, the registration comprising the circuit-switched identifier for the called party and the packet-switched identifier for the called party from the registration request. This registration is preferably stored at the AS. Once the call is complete, the registration may be deleted from the first cellular network (such as from the AS).

Optionally, the method further comprises sending a circuit-switched message from the AS in the first cellular network to the called party in the second cellular network using the circuit-switched identifier provided in the registration request, in response to the received registration request, the circuit-switched message providing a security checking data. Then, the method may further comprise receiving a packet-switched authentication message from the called party at the AS comprising security response data. In this case, the method may further comprise identifying that the circuit-switched message sent by the AS was received by the called party by comparing the security checking data sent by the AS to called party and the security response data received by the AS from the called party. Preferably, the step of adding a registration for the called party is made in response to the step of identifying. This can act as a security measure upon registration with the AS to confirm that the circuit-switched identifier provided by the called party matches its packet-switched identifier used for communicating with the AS. For example, when the called party registers with the AS, it may receive a token within an SMS message that will be valid for use from any TCP-based network. If the token is invalid or reaches an expiry time without using, it expires and a new SMS from the AS is needed to maintain the called party as active.

Advantageously, the calling party communicates with the AS in the first cellular network using a Radio Access Network of the first cellular network. Additionally or alternatively, where the called party is a mobile terminal, it may communicate with the AS in the first cellular network using a Radio Access Network of a second cellular network, although the called party preferably also uses the Internet to communicate with the AS in the first cellular network. A radio access network of one or both of the: first cellular network; and (when applicable) the second cellular network may use a radio access technology from one of: GSM; UMTS; LTE; and WiMax. Other Radio Access Technologies can also be employed.

In the preferred embodiment, the first and second cellular networks have different Mobile Network Codes. Preferably, the first and second cellular networks have different Country Codes (and more preferably, different Mobile Country Codes). More preferably, the first and second cellular networks have different geographical radio access network coverage areas. Thus, the invention may be especially applicable for making international calls.

Preferably, the packet-switched messages use XML format. In embodiments, the method may further comprise sending a call progress indication from the AS to the called party in response to the received request to establish a call.

In another aspect, the present invention may be found in a computer program, configured to carrying out a method described herein when operated on a processor. Additionally or alternatively, the invention may be implemented in hardware or in programmable logic.

In a further aspect, the present invention may be found in a network entity of a first cellular network for managing a call between a calling party that is a mobile terminal in the first cellular network and a called party in a second telephony network. The network entity comprises: an input for receiving a request to establish a call with the called party from the calling party, the called party being identified in the indication by a circuit-switched identifier; a processor for identifying a registration for the called party at the network entity (or another network entity in the first cellular network) using the circuit-switched identifier for the called party, the registration providing a packet-switched identifier for the called party; and a routing controller configured to set up a call between the calling party and the called party by initiating a packet-switched connection from the AS in the first cellular network to the called party in the second telephony network using the packet-switched identifier for the called party. Advantageously, the network entity is an Application Server.

It will be understood that this network entity can optionally comprise features used to implement any of the steps described in connection with the method detailed above. Also, any combination of the individual apparatus features or method features described may be implemented, even though not explicitly disclosed.

BRIEF DESCRIPTION OF THE DRAWINGS

For a better understanding of the invention, embodiments of the invention will now be described, by way of example only, with reference to the accompanying drawings in which.

Reference numerals are repeated in different drawings with no intention to designate the same feature. Where ambiguity may occur, the reference number is qualified with a reference to the respective Figure.

DETAILED DESCRIPTION

The invention deals with the establishment of international calls at low cost. An application based solution is provided which both allows international call establishment at low cost and avoids high use of network resources (of mobile network operators, MNO): for instance IMS licences, HW resize necessities, etc.

In essence a client application is loaded on mobile terminals belonging to subscribers of a given MNO (say Vodafone España). Each such terminal may originate calls and use circuit switch capabilities to start the call. The same client application is installed on mobile terminals that are to act as receivers. The call arrives at the receiver as an IP call through internet (i.e. using the IMS-SIP call establishment procedure).

Using the proposed solution is economical with network resources, such as:

Licences and capacity for SMS wake-up behaviour (described below).

No international carrier or interconnect costs due to internet call.

Figure 1:
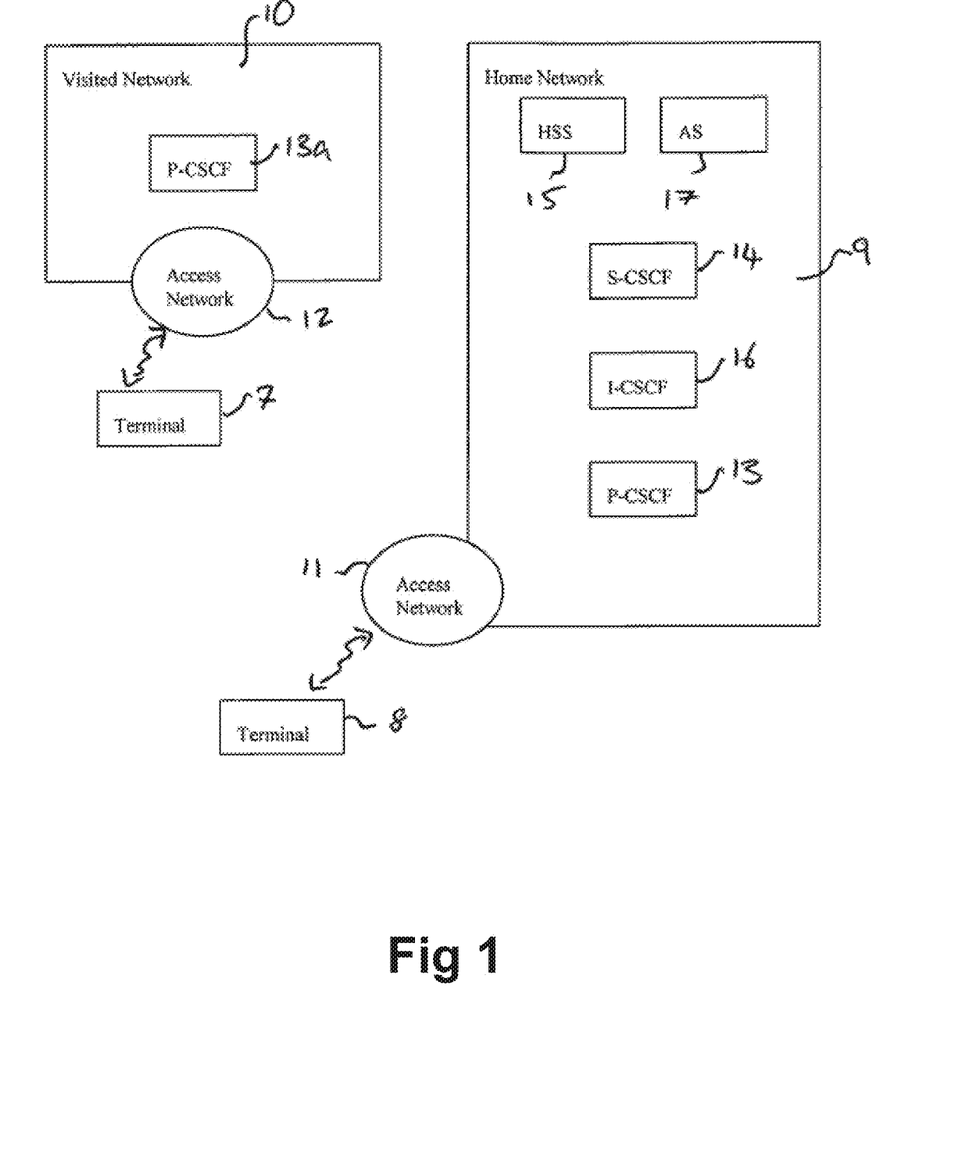
FIG. 1 shows schematically elements of a telecommunications system in an IMS architecture.

As the initial steps of the inventive solution use an IP call, an overview of the IMS architecture is now given with reference to FIG. 1. Terminals 7, 8 are registered with home network 9. Terminal 7 communicates with the home network 9 via a visited network 10, for example because terminal 7 is roaming. The home network 9 and the visited network 10 have respective access networks 11, 12 for communicating respectively with the terminals 7,8, comprising, for example: a radio access network including, in the case of a UMTS(3G) network, a base station (node B) and radio network controller, or, in the case of a GSM network (or a type of GSM network such as a GPRS network) a base transceiver station and a base station controller, or a W-CDMA or a CDMA2000 implementation; a wireless access network such as a WLAN network or a WiMax network; or a fixed access IP network with a DSL or cable modem link.

Each of terminals 7, 8 may be a mobile terminal such as a handheld mobile telephone, a personal digital assistant (PDA), or a laptop computer equipped with a data card; and suitable for communicating with the respective access network.

The home network 9 includes a proxy-call session control function (P-CSCF) 13 for routing signalling from and to terminal 8.

Also included in the home network 9 is a serving-call session control function (S-CSCF) for providing service to terminals 7,8 and routing signalling received from the P-CSCF 13 onward. The S-CSCF 14 also interrogates a home subscriber server (HSS) 15 where appropriate to retrieve, for example, user profile information. The S-CSCF 14 communicates with an application server (AP) 17 for the provision of services. An interrogating-session control function (I-CSCF) determines to which S-CSCF 14 signalling from the terminals 7,8 should be routed.

The HSS 15 performs functions relating to storage and retrieval of subscriber and user profile data. The HSS 15 also has, or has access to, information on the S-CSCF 14 allocated to the terminals 7, 8.

The visited network 10 includes a P-CSCF 13a, which routes signalling between the terminal 7 and the home network 9.

Figure 2:
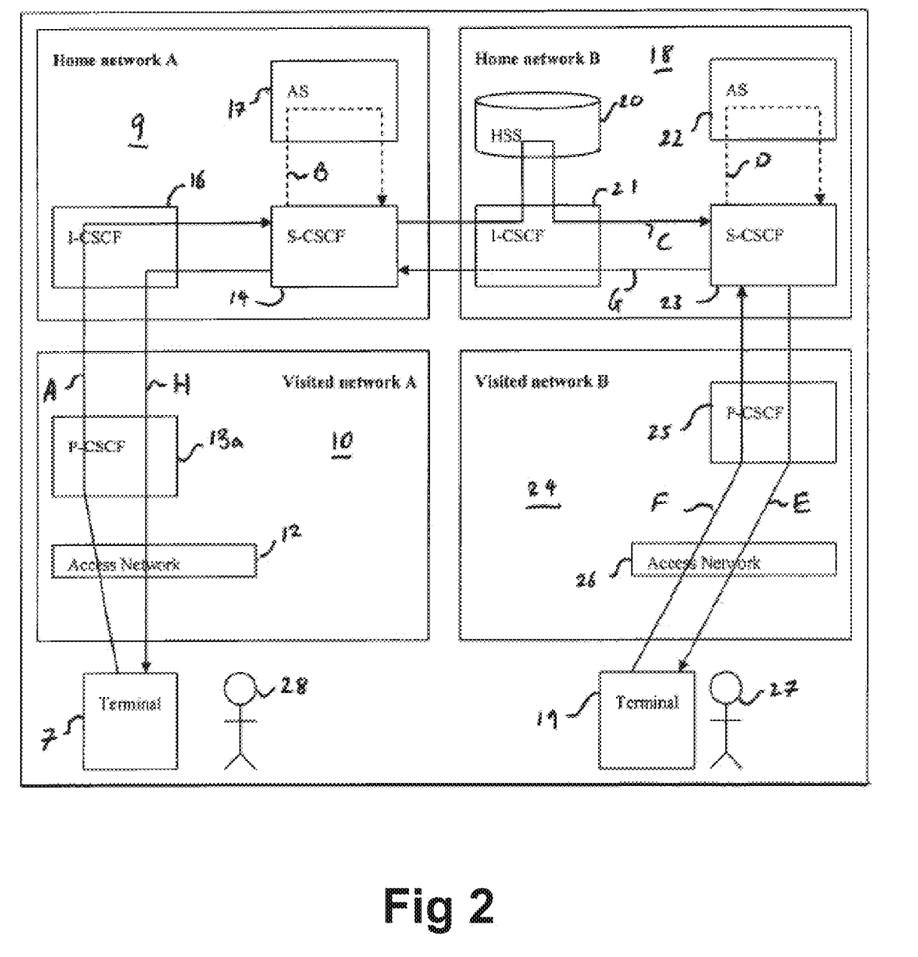
FIG. 2 shows schematically elements of a telecommunications system having an IMS architecture and the signalling path for an INVITE request sent from a calling party's terminal to a called party's terminal, and for a response, when the calling party and the called party are roaming.

FIG. 2 shows elements of the home network 9 and visited network 10 of FIG. 1. FIG. 2 also shows a further home network 18 with which a terminal 19 is registered. The home network 8 includes an HSS 20, an I-CSCF 21, an AS 22 and a S-CSCF 23. The terminal 19 communicates with P-CSCF 25 for routing signalling, received via access network 26, between the terminal and the home network 18. In this embodiment, the home networks 9, 18 are located in the same geographical location. The geographical location is typically a country but in some cases a multiplicity of countries or a part of a country such as a state—this is the case in all embodiments described.

Terminal 19 communicates with its home networks 18 via visited networks 24 because, for example, the called party 9 is roaming. The visited network 24 includes an access network 24 for wireless communication with terminal 19.

FIG. 2 also shows illustratively the signalling that takes place when a calling party 28 attempts to establish a session with a called party 27. At step A, the calling party's terminal 7 sends to the home network 10 an INVITE targeting the terminal 9 using the public user identity of terminal 9; for example, the public user identity might be: "ueb@visitedb.com". The INVITE is received via the access network 12 at the P-CSCF 13a of visited network 10, where it is routed to the I-CSCF 16 of home network 9, which in turn routes the INVITE to the S-CSCF 14.

The S-CSCF 14 determines that a first charging precondition should be added to the INVITE using filter criteria and sends the INVITE to the AS 17 at step B. The AS 17 inserts Session Description Protocol (SDP) lines into the INVITE in order to negotiate charging preconditions with the calling party's terminal 7. The INVITE is returned to the S-CSCF 14.

At step C, the S-CSCF 14 adds an "Organisation-Location" SIP header to the INVITE and indicates the geographical location of the home network 9 in the header; for example, the header might read: "Organisation-Location: Netherlands". The S-CSCF 14 then sends the INVITE to the home network 18 of terminal 19, where it is routed by the I-CSCF 21 to the S-CSCF 23 via the HSS 20. Optionally, the S-CSCF 14 indicates the identity of the network in the header in place of or in addition to the geographical location.

At step D, the S-CSCF 23 determines that a second charging precondition should be added to the INVITE using filter criteria and passes the INVITE to AS 22, which inserts SDP lines into the INVITE in order to negotiate charging preconditions with the called party's terminal 19. The INVITE is then returned to the S-CSCF 23.

At step E, the S-CSCF 23 applies filter criteria, which can be based on the content of the Organisation-Location header. The S-CSCF 23 then sends the INVITE to visited network 24, where the INVITE is routed by the P-CSCF 25 to the terminal 19 via the access network 26.

At step F, the terminal 19 examines the Organisation-Location header to discover the location and/or identity of the home network 9 of terminal 7. The called party 27 will typically be charged for the session because he or she is roaming and so, in order not to prevent establishment of a session, terminal 19 must accept the charging precondition. The terminal 19 initially sends a "183 Session Progress" response to the terminal 7 before establishing whether the charging conditions are met.

If terminal 19 is configured to reject calls from terminals registered with that home network 9 or a home network having the geographical location of home network 9, the terminal 19 rejects the call by sending a "403 Forbidden" response to the terminal 7 via visited network 24, home network 18, home network 9 and visited network 10. Otherwise, the terminal 19 sends a "183 Session Progress" response to terminal 7.

If terminal 19 is configured to demand permission from the called party 27 to accept such calls, the called party 27 will be prompted, for example, by a ring tone sounding, for permission. The ring tone might be different to the standard ring tone for incoming calls to alert the user to the need to accept charges. Terminal 7 optionally plays a ring tone which the calling party 28 will recognise as meaning that the INVITE is awaiting acceptance or rejection.

If the called party 27 consents to establishment of the session, or if terminal 19 is configured to automatically accept calls from the home network and/or the geographical location of the home network 9, the terminal 19 takes no action until it receives confirmation from terminal 7 that the charging preconditions relating to terminal 7 are met. If the called party declines to consent, establishment of the session is terminated.

At step G, the S-CSCF 23 of home network 18 adds a second "Organisation-Location" header to the "183 Session Progress" response which indicates the geographical location of the home network 18 of terminal 19. For example, the header might read: "Organisation-location: Korea". The 183 Session Progress response is then routed to S-CSCF 14, via I-CSCF 21.

At step H, the S-CSCF 14 forwards the "183 Session Progress" response to terminal 7.

At step I (not shown), terminal 7 sends a provisional response acknowledgement (PRACK) request to terminal 19 to acknowledge the "183 Session Progress" response. Terminal 7 then examines the content of the second Organisation-Location header in the "183 Session Progress" response.

If terminal 7 is configured to reject automatically sessions from terminals registered with a home network having the geographical location and/or identity of home network 18, a CANCEL request is sent to the terminal 19.

If terminal 7 is configured to demand permission from the calling party 28 to accept such sessions, the calling party 28 will be prompted, for example, by a ring tone sounding, for permission. The ring tone may be of different sound to the usual ring tone of the terminal in order to alert the calling party 28 that acceptance of charges needs to be indicated for the session is to be established. If the called party 27 indicates acceptance, or if the terminal 7 is configured to automatically proceed with sessions incurring the type of charge applicable to the session to be established, the terminal 7 sends an UPDATE (SDP3) to terminal 19 indicating that the charging preconditions have been met at terminal 7.

To understand the invention better, it is also necessary to explain conventional routing operation for calls between two MNOs. The elements of the two mobile telecommunications networks, and their operation, will now briefly be described with reference to FIG. 3.

Each base station (BS) corresponds to a respective cell of its telecommunications network and receives calls from and transmits calls to a mobile terminal in that cell by wireless radio communication. Such a subscriber's mobile terminal is shown at 1A. The base stations are arranged in groups and each group of base stations is controlled by a mobile switching centre (MSC), such as MSC 2A for base stations 3A,4A and 5A. As shown in FIG. 1, the network A has another MSC 6A, which is controlling a further three base stations 7A,8A and 9A. In practice, the network A will incorporate many more MSCs and base stations than shown in FIG. 3.

Figure 3:
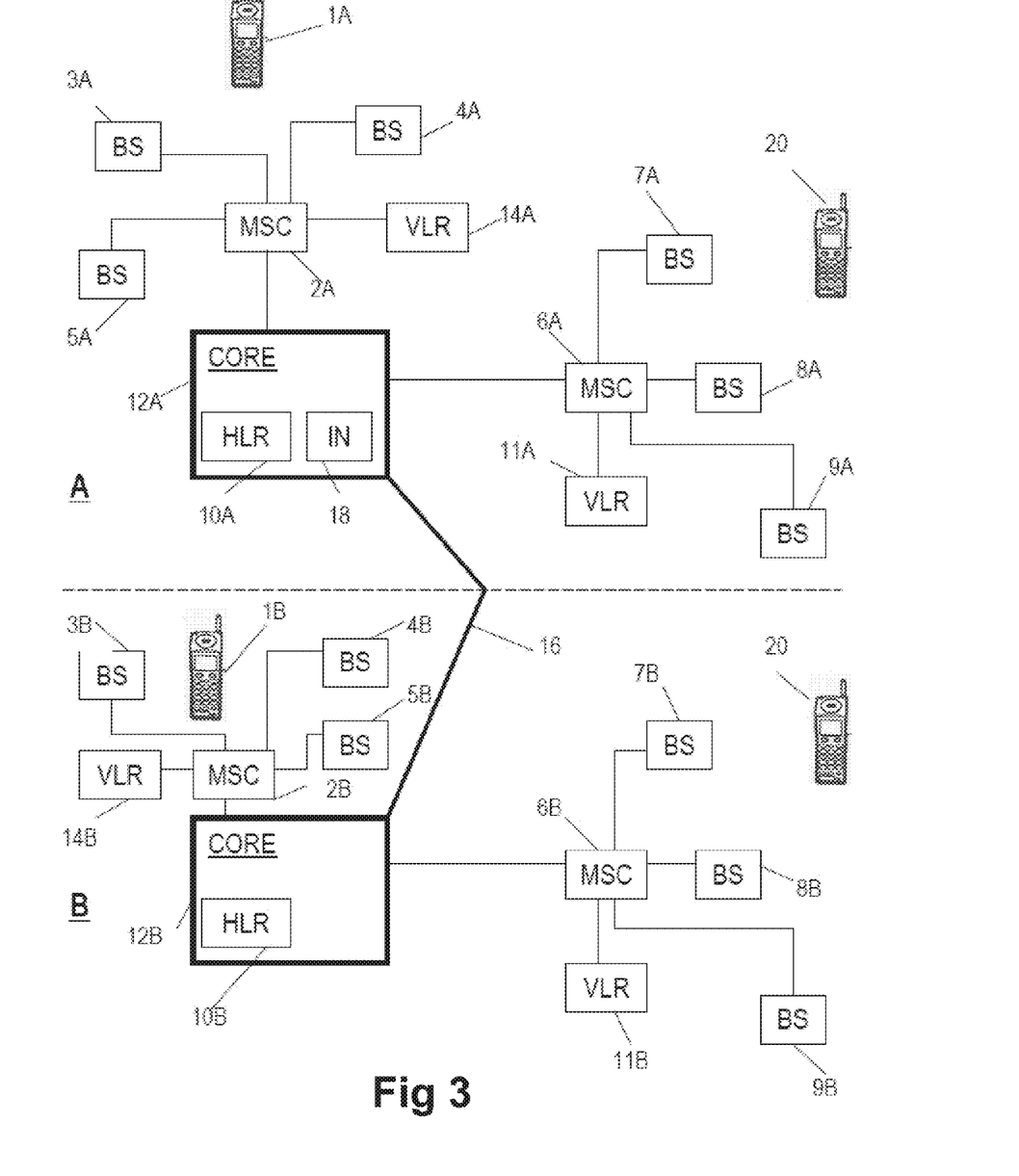
FIG. 3 shows the routing of calls between two cellular networks using a conventional MSISDN.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not typically known to the subscriber. The subscriber is issued with a publicly known number, that is, the subscriber's telephone number, by means of which calls to the subscriber are initiated by callers. This number is the MSISDN. In addition, the mobile terminal 1A is a member of a VPN, and may also have a code number, as described above.

The network includes a home location register (HLR) 10A which, for each subscriber to the network, stores the IMSI and the corresponding MSISDN together with other subscriber data.

When the subscriber wishes to activate their mobile terminal in a network (so that it may make or receive calls subsequently), the subscriber places their SIM card in a card reader associated with the mobile terminal (terminal 1A in this example). The mobile terminal 1A then transmits the IMSI (read from the card) to the base station 3A associated with the particular cell in which the terminal 1A is located. The base station 3A then transmits this IMSI to the MSC 2A with which the BS 3A is registered.

MSC 2A now accesses the appropriate location in the HLR 10A present in the network core 12A and extracts the corresponding subscriber MSISDN and other subscriber data from the appropriate storage location, and stores it temporarily in a location in a visitor location register (VLR) 14A. In this way, therefore the particular subscriber is effectively registered with a particular MSC (MSC 2A), and the subscriber's information is temporarily stored in the VLR (VLR 14A) associated with that MSC.

Each of the MSCs of the network (MSC 2A and MSC 6A) has a respective VLR (14A and 11A) associated with it and operates in the same way as already described when a subscriber activates a mobile terminal in one of the cells corresponding to one of the base stations controlled by that MSC.

When the subscriber using mobile terminal 1A wishes to make a call, having already inserted the SIM card into the reader associated with this mobile terminal in the manner described, a call may be made by entering the telephone number of the called party in the usual way. This information is received by the base station 3A and is then routed to the called party via the MSC 2A. By means of the information held in the VLR 14A, MSC 6A can associate the call with a particular subscriber and thus record information for charging purposes.

Similarly, when a calling party (whether a subscriber within the network A or outside it) makes a call for the subscriber using mobile terminal 1A, MSC 2A is able to route this call to mobile terminal 1A via base station 3A using the information relating to that subscriber which is temporarily stored in VLR 14A.

The foregoing is intended to be merely a simplified description of the normal operation of the GSM network. In practice, other procedures will be carried out. In particular, an authentication procedure will take place when a subscriber activates a mobile terminal using their SIM.

Also shown in FIG. 3 is a second GSM network B. Items in network B corresponding to those in network A are similarly referenced, but with the suffix "B" instead of "A". Of course, the network "B" is likely to have a different arrangement and number of MSCs and base stations but operates in a similar manner to network A.

As explained above, for a subscriber to network A, the respective IMSI and MSISDN and other relevant data particular to that subscriber will be stored in HLR 10A. If that subscriber now roams to network B and activates a mobile such as MS 1B in that network, the procedure described above is substantially repeated.

Thus, the subscriber inserts their SIM card into the card reader of mobile terminal 1B. The mobile terminal 1B then transmits the IMSI from the card to the adjacent base station (3B) and thence to MSC 2B.

However, MSC 2B will now recognise, from the structure of the IMSI, that the subscriber is not a subscriber to network B but a subscriber to network A. Therefore, MSC 2B will access, via core 12B, HLR 10A instead of HLR 10B using the interconnection 16 (FIG. 3) between network A and network B. The subscriber's information, including the relevant MSISDN and other subscriber data, will be accessed and temporarily stored in the VLR 14B. All this information is thus ready for use in processing calls to or from mobile terminal 1B. Any charging information associated with any such calls can then be associated with the subscriber information in VLR 14B and eventually transmitted back to HLR 10A and then billed to the relevant subscriber.

If a calling party wishes to make a call to a visiting subscriber who is using mobile terminal 1B, the call would initially be routed to network A (because this network would be the network identified by the subscriber's publicly known telephone number which the calling party would use). The core 12A would interrogate HLR 10A which would thus produce an indication that a copy of the subscriber's data was temporarily stored in VLR 14B, indicating, of course, that the subscriber had roamed to network B. Via the link 16 (FIG. 3) between networks A and B, network A interrogates network B to request a "roaming number". This is in effect a temporary telephone number for the subscriber, being a number appropriate to network B. This roaming number can now be used to route the calling party's call to network B and thence to mobile terminal 1B. The calling party would of course not be aware of this roaming number or of the transferring process.

The foregoing description is merely a simplified description of the normal operation of the GSM network and roaming between GSM networks. Further details of all aspects of GSM networks and roaming are available in the ETSI Standards documentation.

Figure 4:
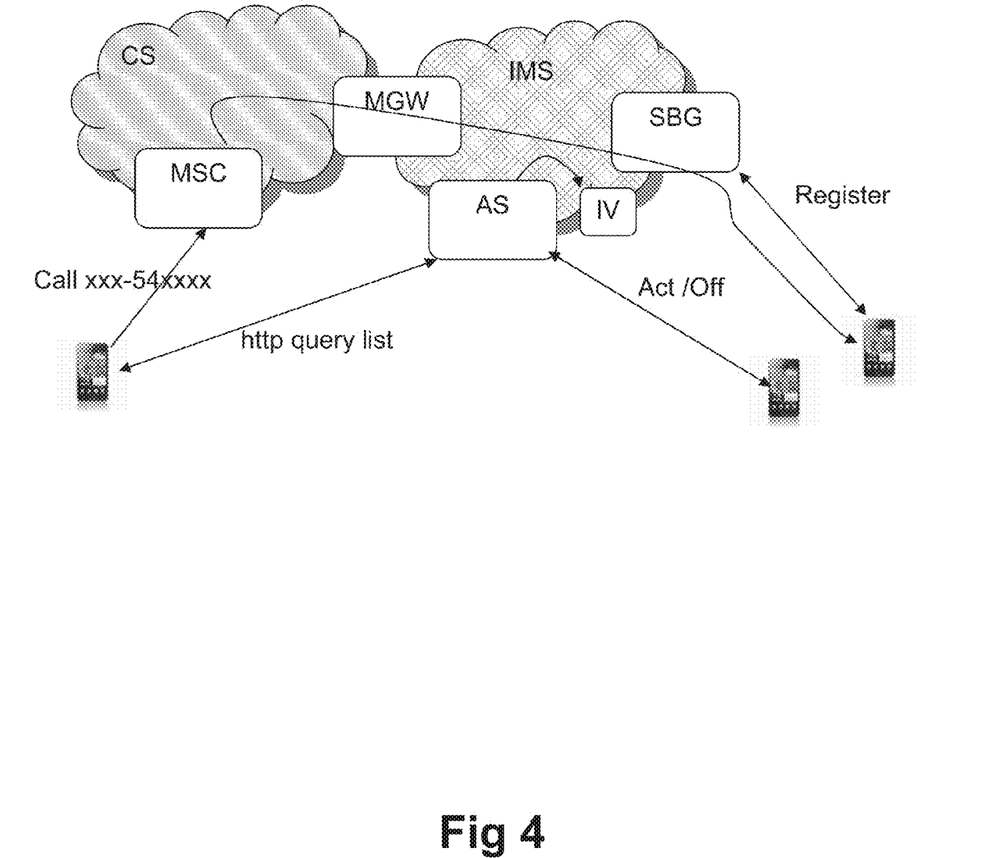
FIG. 4 shows the logical arrangement of network entities in accordance with the invention.

The logical arrangement of network entities in accordance with the invention is illustrated in FIG. 4. The calling terminal (mobile A) originates a call first establishing a radio access channel via the MSC to the circuit switched domain of the core network [call xxx-54xxxx].

In the conventional IMS call establishment, a call establishment request is then conveyed via the gateway entity (MGW) across the IMS domain and through a Session Border Gateway (SBG) [these are often referred to as Session Border Controllers (SBC)]. Once basic information regarding the destination mobile terminal has been retrieved from the IMS system, this is then related to the calling party. The call can then be established.

In the inventive solution, an XML formatted message is sent via IP connection to an application server (AS) by a client application executed on Mobile A. The AS then determines the activity status of the destination terminal (Mobile B) using an instance of the client application executing on Mobile B. Where both terminals are active the call may be established as a conventional call without requiring the conventional signalling between networks typically entailed by international calls.

Figure 5:
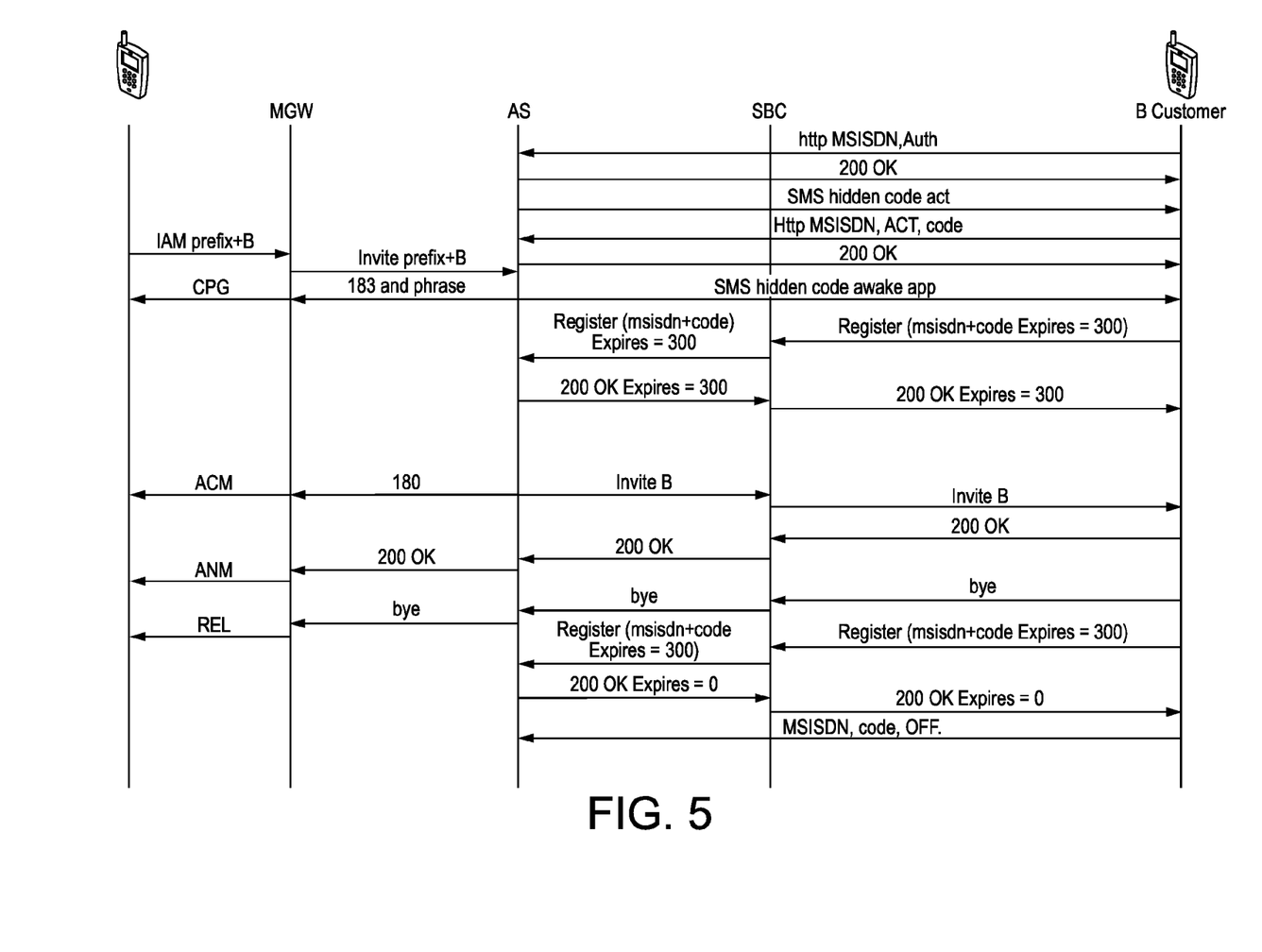
FIG. 5 shows the relevant signalling steps for implementing the method of the invention.

The signalling steps for implementing one implementation of the method of the invention (as illustrated in FIG. 5) are as follows:

1.—An originator mobile terminal (Mobile A) with a client application installed and with a SIM registered with a first cellular network—say Vodafone España (VF-ES).

In this scenario, the client application acts as originator and allows the user to review a contact list. Using an XML query to an Application Server (AS) will see all the International contacts (for a VF-ES originator, numbers that do not start with +34 or 0034) and shows a suitable indicator (say red or green circle near each of the contacts) indicating if is available or not.

Available in this sense means that application is installed on destination mobile (called B) and authenticated on the (second) network.

2.—Mobile B has a non VF-ES SIM card and is registered on a network different from VF-ES. The installed client application ensures that the terminal can act as receiver and will try to activate on an AS to gather an identification code.

The client application asks the user for its own MSISDN and sends the MSISDN obtained using an XML interface to the AS.

3.—The AS will receive the activation request and will trigger a hidden SMS with a secret id code to the MSISDN allowing the application to answer via XML with this code.

AS will store on database this customer as an active customer.

4.—Once the B customer is registered as active any A customer will be able to make a call from the application.

When Mobile A select the contact number and call application will establish a circuit switched call adding a prefix to this number indicating to the relevant circuit switch network that this call has to be route to IP cloud using the media Gateway (MGW).

5.—The MGW connects the call with AS. The AS will check if the destination number is recognized as an active B customer and will answer with a 183 code and will include a notification to the Mobile A number saying "we are connecting you to your contact, please wait a moment"

AS will send an hidden SMS to B MSISDN to make the application wake-up and trigger a register to SBC.

6.—Application will trigger the register of B MSISDN on SBC with an expiration code=300 sg that will be redirected to AS from SBC.

7.—Once the register has been done successfully AS establish the final call with an 180 code or reinvite to MGW and sending an invite to B number.

8.—Once the call is released all resources will be released and AS will send a 200 OK with expiration time=0 to avoid that the B number stays registered on SBC.

There now follows a more detailed explanation of the necessary functions of the different network entities implementing the invention.

AS Functions

Customer Authentication:

AS has a SOAP interface over http that allows the reception of an MSISDN and triggers a hidden SMS to this MSISDN.

The SMS sent to Mobile B user will have an alphanumeric code that will be generated randomly for each user.

A suitable code length might be 10 characters.

XML call fields description:

| FIELD | Description |
| --- | --- |
| Action | Value AUTH indicates that it is necessary to authenticate an MSISDN. |
| MSISDN | The MSISDN needing authentication. |

XML answer fields description:

| FIELD | Description |
| --- | --- |
| CODE | Random alphanumeric code 10 characters in length |

SMS content:

SMS content INTCALLREG|346105123231234d43w3e4

AS stores the relationship between MSISDN's and associated codes and will register the status active or not.

If AS receive a request with an MSISDN that already exist on the database then will act as if it where a new MSISDN and will generate another code.

MSISDN Status Change (Active, Off):

There is an XML function that allows change of the status of each MSISDN on the database.

AS will receive MSISDN and code and will have a timer that in case there are not new orders on this period will switch the Mobile status to 'off'.

XML CALL:

| FIELD | Description |
|---|---|
| Action | Value ACT indicates that it is desired to activate an MSISDN. Value OFF indicates that it is desired to activate an MSISDN. |
| MSISDN | The MSISDN needing authentication. |
| CODE | The random 10 alphanumeric code generated in the authentication phase |

Presence Information:

AS may query whether a list of MSISDN's are active or off.

Presence request:

| FIELD | Description |
|---|---|
| MSISDN list | listing the MSISDN's for which presence is requested and comprising a list of MSISDN and status pairs: |
| MSISDN | MSISDN |
| STATUS | empty in the query |

Answer XML:

| FIELD | Description |
|---|---|
| MSISDN list | listing the MSISDN's for which presence is requested and comprising a list of MSISDN and status pairs: |
| MSISDN | MSISDN |
| STATUS | value 0 if state is OFF value 1 if the state is ACT |

SBC Register and Unregister:

AS whenever an invite arrive from MGW removes the prefix and will check if the MSISDN is active on its data base.

If MSISDN is active answers with "180" to MGW and will send the hidden SMS described before to the application.

In order to avoid a long silence or a timeout to the call coming from Mobile A the AS may connect A number with a voice message telling "we are proceeding to connect to your contact number. Please wait"

Hidden SMS contents:

INTCALLENTR|34610512323|234d43w3e4

The application will wake-up and register on the SBC sending the code and MSISDN that will be redirected to AS and check if code is correct to allow the registration.

In case is allowed AS will answer with 200OK with an expiration time set to 300 seconds and each time the application send another register the AS will answer the same till the call ends and the resources are released.

When resources are released AS will answer with 200 OK and expiration time set to 0 sec in order to force the de-registration of this MSISDN from SBC Filtering Function:

AS preferably only allows the activation and registration of MSISDN's with a country code (CC) different from 34.

Exceptionally and to allow local test from VF-ES, there will be a white list with some national numbers that will be treated as international numbers and will be allowed to register and receive calls.

Application Functions

There will be a single application that will cover operation either as receiver or as caller and the activation of each mode will depend on the network and/or the SIM card used on the phone.

Caller Functionality:

Once the application is installed it checks the IMSI SIM card in your phone and the digits for the MCC and MNC 21401 or 21406 belong to are those for VF-ES and also the network where the phone is located also corresponds one of those MCC and MNC's then activate the caller feature By clicking on the application the user will be able to see phone's contact book filtered to international numbers only.

This book will look different from the native phone so the customer can identify which is the application itself.

The application performs a query for all international contacts to find AS ON or OFF status of each and will show the contact list with a red or green circle near of each contact indicating if the contact is active or not.

The customer can call any of the contacts with the green icon and the call will be done over circuit switch network adding a prefix to the destination number to allow a different routing of it through the IP network.

Receiver Functionality:

The application once it is installed will check the IMSI SIM card in your phone and the digits for the MCC and MNC do not correspond to 21401 or 21406 and the network it is connected does not match the MCC 214 then activates the Receiver functionality.

If this condition is met then the application will send an order authentication to the AS sending the MSISDN previously asked to the customer.

Then it waits to receive a hidden SMS that will content an identification code:

INTCALLREG|34610512323|234d43w3e4

Once the application knows the code then will send an activation order through XML interface with the MSISDN and the id code.

This activation order has to be send each x minutes to assure it continues active and is not automatically deregistered.

In case the client application receives an error code indicating that code is not valid then must start authentication from the beginning to get a new one.

The client application will state sleep waiting for a Wake-up SMS

INTCALLENTR|34610512323|234d43w3e4

Once the SMS is received the app must start the registration on SBC sending the MSISDN and the code.

Each time the phone is turn off or the app is stopped must be send a status change order to set the status to off.

Each time the application wakes up alter the hidden SMS will send register orders every x minutes depending on the expiration time configured. All of them will be send with the expiration time set to 300 sec. except the last one after the call is finished that will be send with expiration time set to 0 sec. Thereafter, this last message will stay sleep waiting for another call.

The invention claimed is:

1. A method of managing a call between a calling party that is a mobile terminal in a first cellular network and a called party in a second telephony network, the method comprising:

receiving at an Application Server, AS, of the first cellular network a request from the calling party to initiate a new call to the called party, the called party being identified in the request by a circuit-switched identifier;

identifying a registration for the called party in the first cellular network using the circuit-switched identifier for the called party, the registration providing a packet-switched identifier for the called party;

sending a circuit-switched message from the first cellular network to the called party in the second network using the circuit-switched identifier for the called party provided in the request;

receiving the circuit-switched message by the second network and in response thereto, activating an application on a terminal of the called party for receiving packet-switched calls from the AS in the first network; and initiating the new call from the calling party to the called party by initiating a packet-switched connection from the AS in the first cellular network to the called party in the second telephony network using the packet-switched identifier for the called party.

2. The method of claim 1, wherein the request is a circuit-switched request, the method further comprising:

identifying, at the first cellular network, the circuit-switched request from the calling party to initiate the new call to the called party; and routing the request to the AS in the first cellular network.

3. The method of claim 2, further comprising:

determining, at the first cellular network, that the circuit-switched request to initiate the new call is intended for the AS based on information in the request; and wherein the step of routing the request to the AS is in response to the determination.

4. The method of claim 1, wherein the step of initiating the new call from the calling party to the called party comprises:

setting up a circuit-switched connection between the calling party and the first cellular network; and setting up a packet-switched connection between the AS in the first cellular network and the called party in the second network.

5. The method of claim 1, wherein the circuit-switched message uses the short messaging service.

6. The method of claim 1, further comprising:

determining that the called party is not able to receive an IP-based call from the AS; and wherein the step of sending the circuit-switched message is carried out in response to the step of determining.

7. The method of claim 1, further comprising:

receiving packet-switched data from the called party at the AS in the first cellular network, the packet-switched data identifying an activity status for the called party; and storing the received activity status at the AS in the first cellular network.

8. The method of claim 7, further comprising:

communicating an indication of the activity status for the called party to the calling party based on the activity status stored by the AS for the called party.

9. The method of claim 7, further comprising:

determining that the called party is not able to receive an IP-based call from the AS; and wherein the step of sending the circuit-switched message is carried out in response to the step of determining; and wherein the step of determining that the called party is not able to receive an IP-based call from the AS is based on the activity status stored by the AS for the called party.

10. The method of claim 1, further comprising:

receiving a registration request from the called party in the second network at the AS in the first cellular network, the registration request identifying the circuit-switched identifier for the called party and the packet-switched identifier for the called party; and adding a registration for the called party at the first cellular network, the registration comprising the circuit-switched identifier for the called party and the packet-switched identifier for the called party from the registration request.

11. The method of claim 10, wherein the step of receiving the registration request is in response to the step of sending the circuit-switched message.

12. The method of claim 10, further comprising:

sending a circuit-switched message from the AS in the first cellular network to the called party in the second network using the circuit-switched identifier provided in the registration request, in response to the received registration request, the circuit-switched message providing a security checking data;

receiving a packet-switched authentication message from the called party at the AS comprising security response data; and identifying that the circuit-switched message sent by the AS was received by the called party by comparing the security checking data sent by the AS to the called party and the security response data received by the AS from the called party; and wherein the step of adding the registration for the called party is made in response to the step of identifying.

13. The method of claim 10, further comprising:

deleting the registration for the called party at the first cellular network once the call is complete.

14. The method of claim 1, wherein the calling party communicates with the AS in the first cellular network using a Radio Access Network of the first cellular network.

15. The method of claim 14, wherein the radio access network of the first cellular network uses a radio access technology from one of: GSM; UMTS; LTE; and WiMax.

16. The method of claim 1, wherein the called party is a second mobile terminal and the second telephony network is a second cellular network.

17. The method of claim 16, wherein the called party communicates with the AS in the first cellular network using a Radio Access Network of the second cellular network.

18. The method of claim 16, wherein the first and second cellular networks have different Mobile Network Codes.

19. The method of claim 1, wherein the first and second networks have different Country Codes.

20. A computer program product embodied on a non-transitory computer-readable medium, comprising instructions to carry out a method of managing a call between a calling party that is a mobile terminal in a first cellular network and a called party in a second telephony network, the method comprising:

receiving at an Application Server, AS, of the first cellular network a request from the calling party to initiate a new call to the called party, the called party being identified in the request by a circuit-switched identifier;

identifying a registration for the called party in the first cellular network using the circuit-switched identifier for the called party, the registration providing a packet-switched identifier for the called party;

sending a circuit-switched message from the first cellular network to the called party in the second network using the circuit-switched identifier for the called party provided in the request;

receiving the circuit-switched message by the second network and in response thereto, activating an application on a terminal of the called party for receiving packet-switched calls from the AS in the first network; and initiating the new call from the calling party to the called party by initiating a packet-switched connection from the AS in the first cellular network to the called party in the second telephony network using the packet-switched identifier for the called party.

21. An Application Server (AS) configured to be positioned in a first cellular network to manage a call between a calling party that is a mobile terminal in the first cellular network and a called party in a second telephony network, the AS comprising:
- an input that receives a request from the calling party to initiate a new call to the called party, the called party being identified in the request by a circuit-switched identifier;
- a processor that identifies a registration for the called party at the first cellular network using the circuit-switched identifier for the called party, the registration providing a packet-switched identifier for the called party;
- a transmitter that sends a circuit-switched message to the called party in the second network using the circuit-switched identifier for the called party provided in the received request, the circuit-switched message being configured to cause activation of an application on a terminal of the called party for receiving packet-switched calls from the AS; and
- a routing controller that initiates the new call from the calling party to the called party by initiating a packet-switched connection from the AS in the first cellular network to the called party in the second telephony network using the packet-switched identifier for the called party.

22. A method of managing a call between a calling party that is a mobile terminal in a first cellular network and a called party in a second telephony network, the method comprising:
- receiving at an Application Server (AS) of the first cellular network a registration request from the called party in the second network identifying a circuit-switched identifier for the called party and a packet-switched identifier for the called party;
- sending a circuit-switched message from the AS in the first cellular network to the called party in the second network using the circuit-switched identifier provided in the registration request, in response to the received registration request, the circuit-switched message providing a security checking data;
- receiving a packet-switched authentication message from the called party at the AS comprising security response data; and
- identifying that the circuit-switched message sent by the AS was received by the called party by comparing the security checking data sent by the AS to called party and the security response data received by the AS from the called party;
- in response to the step of identifying, adding a registration for the called party at the first cellular network, the registration comprising the circuit-switched identifier for the called party and the packet-switched identifier for the called party from the registration request;
- receiving at the AS a request from the calling party to establish a call with the called party, the called party being identified in the request by the circuit-switched identifier;
- identifying the registration for the called party in the first cellular network using the circuit-switched identifier for the called party, the registration providing the packet-switched identifier for the called party; and
- setting up a call between the calling party and the called party by initiating a packet-switched connection from the AS in the first cellular network to the called party in the second telephony network using the packet-switched identifier for the called party.

* * * * *